Nov. 10, 1959     J. A. BARNES ET AL     2,912,338

TOMATO BASIC AND METHOD OF PRODUCING SAME

Filed May 31, 1957

INVENTOR.
JOHN A. BARNES
LEONARD P. WORTHEN
BY
Williamson, Schroeder, Adams & Meyers
ATTORNEYS

United States Patent Office 2,912,338
Patented Nov. 10, 1959

2,912,338

TOMATO BASIC AND METHOD OF PRODUCING SAME

John A. Barnes, Circle Pines, and Leonard P. Worthen, Robbinsdale, Minn., assignors to The Pillsbury Company, a corporation of Delaware Application May 31, 1957, Serial No. 662,730

16 Claims. (Cl. 99—204)

This invention relates to manufactured food products. More particularly, it relates to a particular food product referred to in the trade as to tomato basic, and a method or process for manufacturing the same.

There is an important need in the food industry for a product known as a tomato basic which will meet the accepted requirements for such a product. A tomato basic is a product consisting of primarily tomato solids, which is prepared and stored for later use in the production of foods wherein tomato is a desired component. Various tomato basics have been produced previously but all of them have had certain basic disadvantages which make them unsatisfactory for commercial use. For example, most such tomato basics are hygroscopic and will cake when stored and become not free-flowing and lumpy unless packed in a hermetically sealed container, the cost of which renders the product commercially prohibitive. Most known methods of preparing a tomato basic, cause the flavors of the tomato product to volatize and become lost. They also produce a product which has an unstable coloring which breaks down during storage and changes from a tomato red to a dirty brown color. The resultant product, after storage, tastes flat and differently from what the user has a right to expect, which is a natural tomato flavor, odor, and color which will whet his appetite in view of his past associations with fresh tomato products. Such a product will lose its flavor and take on off-flavors, making the product objectionable for use.

Various different methods of drying a proposed tomato basic product have been utilized in the past. Drum drying, spray drying, and roller-drum drying have all been utilized, but all have been unsuccessful because of various disadvantages attendant therewith. The resultant product in each case is unstable and will lose its flavor and color while on the shelf and will pick up off-flavors. In addition, these various methods require skilled technicians to practice them, and in order to insure a reasonably satisfactory product, expensive handling and manufacturing conditions must be maintained.

We have found that all of these disadvantages can be eliminated if the tomato component is mixed with certain critical proportions of starch and edible fats (such as shortening), and pan or shelf dried under certain critical temperature and air pressure conditions. When these conditions are met, the resultant tomato basic product has a good color and flavor and is unusually stable with respect to both of these characteristics. In addition, it is non-hygroscopic so that it can be stored on the shelf for relatively long periods without becoming lumpy or caked and without any breakdown in either color or flavor.

It is a general object of our invention to provide a novel and improved tomato basic food product and a method for making the same, which can be manufactured, packaged, and sold commercially at a non-prohibitive cost.

A more specific object is to provide a novel and improved tomato basic food product which is stable as to flavor and color throughout prolonged storage under normal packaging conditions.

Another object is to provide a novel and improved tomato basic food product which is non-hygroscopic and hence can be stored for prolonged periods in a package which is not hermetically sealed without the product becoming caked or lumpy.

Another object is to provide a method for producing an improved tomato basic product which will not lose flavor or color under storage conditions and which is non-hygroscopic so that the product will not become caked or lumpy during storage.

Another object is to provide a novel and improved tomato basic food product and a method for making the same which can be manufactured and packaged at a non-prohibitive cost and will nevertheless not lose its flavor or take on other flavors, will not undergo a change in its color, and will not become caked or lumpy under normal shelf-storage conditions.

Another object is to provide a novel and improved tomato basic food product and a method for making the same which can be practiced more easily than by methods heretofore known.

These and other objects and advantages of our invention will more fully appear from the following description made in connection with the accompanying drawings wherein like reference characters refer to similar parts throughout the several views, and in which.

Figure 1:
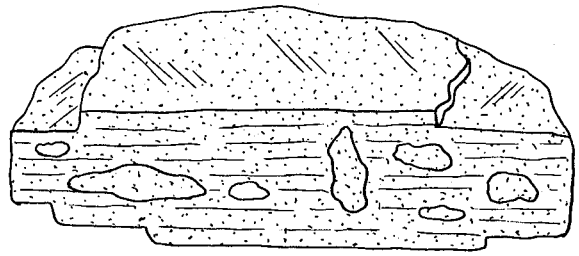
Fig. 1 shows a cake of our new tomato basic product in sheet form as it appears immediately after being removed from the drying apparatus.

In the manufacture of our improved tomato basic product, we commence with a tomato puree which has tomato solids in proportion of approximately 26% by weight. If desired, a tomato paste having tomato solids of approximately 36% by weight may be utilized, but in the latter event the proportions of starch and edible fats would have to be increased accordingly. For the sake of the instant application, the porportions recited will be those used in conjunction with a tomato puree, wherein the tomato solids approximate 26% by weight of the mixture. To such a tomato puree, we add starch gradually while the puree is being mixed and the mixture is in motion. The starch should be added gradually in amounts preferably between 5 to 7% by weight of the mixture. This is the optimum starch content and yields a good product. Actually, there is no maximum as to the amount of starch which may be utilized, and it may be added according to the quality and flavor desired, but when the level of 7% by weight of the weight is exceeded for the starch component, the resultant product has a poor flavor. A minimum starch content by weight of approximately 1% should be recognized for at least some starch must be added in order to obtain a satisfactory product. We prefer to utilize starch in amounts approximating 6.5% by weight of the mixture although a range of 5–9% by weight of the mixture yields a product satisfactory for many purposes. If desired, wheat flour or potato flour may be used of the mixture as a substitute for the starch but in that event, a greater proportion by weight would have to be used.

The edible fats or oil should be in a free flowing state before being added to the mixture. We use shortening and we melt the same before adding it to the mixture. This melted shortening is added gradually but need not necessarily be so added. It is mixed in the mixture with the remainder of the mixture for approximately three minutes or more so as to insure complete mixing and insure that the fat will be uniformly distributed. The edible fats or oils added, should not exceed a maximum proportion exceeding 10% by weight of the mixture. There appears to be no determinable minimum for the amount of fat to be added except that there must be a certain amount of fat in order to avoid absorption of moisture from the air. It appears that edible fats in proportions of less than 1% might suffice to prevent caking. The optimum proportion which we have found yields the best end product, falls within the range of 3 to 4% by weight of the mixture. We prefer to use edible fats in the proportion amounting to 3.5% by weight although a range of 2–5% by weight gives excellent results.

It should be noted that all of the equipment which is utilized in the mixing and drying of this product should be stainless steel or some other similar metal or product which will avoid the tendency of tomato products to pick up flavors and portions of the metal which will cause discoloration of the tomato product.

After the tomato puree, starch and shortening, have been thoroughly mixed in the manner and in the proportions described above, we spread the mixture onto pan dryers in amounts of about two pounds per square foot. Actually any one of the vacuum pan or shelf driers currently purchasable on the market may be utilized for the drying operation so long as they can provide the conditions under which the drying operation is to be performed as hereinafter described.

The vacuum pan or shelf drier preferably used, provides for the use of a hot water heating system. We utilize hot water in this system at the preferred temperature of 190° F., and we conduct the drying operation at the preferred vacuum of 28.5 inches of mercury. The relatively low temperature of 190° F. within the hot water system is utilized so as to provide leeway in removing the product from the oven before it burns. By using hot water at 190° F. in this system, we also avoid the existence of "hot spots" for if the temperature of the water is sufficiently low the "hot spots" won't damage local areas of the product. We dry the product under these conditions until the moisture content of the product is below 10% by weight, and then the product is removed from the drying chamber. The product must be removed while there still remains a certain amount of moisture in the product, and our end product contains moisture actually approaching 10% by weight. The drying operation normally takes approximately six hours although it is possible that this time may be shortened through the use of steam in the drying system during the earlier stages of the drying operation. We are now investigating this possibility.

During the drying operation, we pull samples at regular intervals to determine the moisture content of the product. A thermocouple is helpful in warning when the drying time limit is approaching, for there is a limit above which the temperature of the end product must not pass.

During the early stages of the drying operation, the temperature of the product is approximately 40° F., and as the moisture evaporates from the product the temperature of the product commences to rise. We remove the product when the temperature thereof reaches 130° F., for we find that at this temperature the product will have less than 10% moisture by weight which gives us a most desirable end product. The preferred top limit of the temperature of the product is approximately 160° F., and it is desirable to never allow the temperature of the product to exceed that level. However, there is an absolute maximum of 190° F., above which the temperature of the product must not pass, for serious damage to the end product will result if the temperature is permitted to go above that level. The product will darken at temperatures above 190° F., so that the end product is not as desirable when this occurs. The minimum product temperature which must be attained in order to provide the reasonably satisfactory product is about 80° F.

It should be noted that the particular method of drying is critical for none of the other methods known for drying will yield a satisfactory product. Vacuum pan or shelf drying has proved to be a necessary feature of the method of manufacturing this desirable end product. The vacuum increases the surface area of the product which is available to the hot air for drying and causes puffing which makes the product aerated. The use of a vacuum within the ranges hereinafter recited keeps the boiling point of the water below 160° which is a desirable temperature level above which the temperature of the product preferably should not pass. The hereinafter recited vacuum ranges reduces the temperature which is required for drying the product and thus permits the product to be dried at a temperature level which will not damage the color and flavor of the product.

The preferred vacuum level which we utilize, is 28.5 inches of mercury. The lowest vacuum level at which a relatively satisfactory product can be obtained is approximately 27.5 inches of mercury. Such a vacuum level yields a fairly unsatisfactory product despite fluctuations in the components and temperatures, and yields a product resembling peanut brittle in consistency. An absolute lower limit level for the vacuum is 26.0 inches of mercury, for below this level it is impossible to obtain even an inferior but acceptable end product. So far as we have been able to determine, there is no maximum vacuum level except, of course, the upper limit to which it is possible to produce a vacuum.

Figure 2:
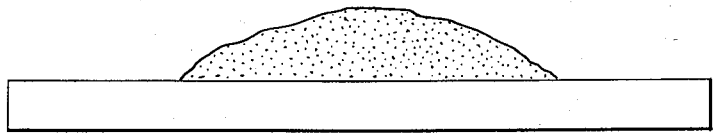
Fig. 2 shows a sample of our new tomato basic product after it has been ground preparatory to packaging the same for marketing.

When a vacuum of 28.5 inches of mercury is utilized, there is a good end product which is yielded. This end product has good color and has a good distribution of its fats therein. It is porous and has a better flavor than when produced at other levels of vacuum. It has also been found that it reconstitutes in water much better than other end products and it is easier to grind. When the product temperature reaches 130° F. the moisture content thereof is about 10%, and it is at that level that we remove the product from the dryer. The product is then in a sheet form as shown in Fig. 1, and it will be noted by reference to the figure that it is porous or aerated. After the product has cooled in its cake form, it can be either ground immediately, or stored in a drum for subsequent grinding. When the end product is ground, it has a good color and flavor, and has a consistency much as shown in Fig. 2.

Although it has been possible, by methods heretofore known, to produce a tomato basic which has a good flavor and color, such a product is quite hygroscopic and must be packed in a hermetically sealed can with a desiccant therein, in order to keep the moisture content of the product below 1%. The cost of packaging this product is thereby made prohibitive. In addition, the cost of handling the product and of processing it makes the commercial manufacture and use of this product not feasible. Such a product will cake in relative humidity of approximately 20% while our product will not cake under normal ambient conditions. Our product, like all other tomato basic products, must be protected against light, and therefore must be packed within an opaque container. Our method, however, retards the development of weedy odor and yellow-brown color in the product caused by carotene pigments. Our method causes the fat particles to wrap around the tomato crystals or fibers and inhibit oxidation, thereby precluding the development of weedy odor and yellow-brown color.

In addition to the fact that our tomato basic product is highly superior in characteristics to those heretofore known, there is an added advantage in our method or process of manufacture, in that the controls used therein are simpler to watch and maneuver. Our manufacturing method involves the use of fewer variables and the variables that we do utilize are easily measured. Furthermore, a skilled laborer or technician is not required to follow or practice our method or process. This is in sharp contrast to other methods or processes of manufacture such as wherein spray drying is utilized, which is extremely sensitive and difficult to properly practice, and drum drying which is also difficult, but to a lesser extent. The cost and production rate involved in practicing the method or process of manufacture of our tomato basic product are substantially less than that of previously known methods. Our methods or processes cost only about two-thirds of the known processing costs for tomato basics which are known today. In addition, these known tomato basics have less desirable characteristics. The equipment required to practice our method of manufacture is relatively low in cost for pan drying is cheaper than other known methods of drying. Also the packaging costs are kept at a minimum when the end product has the desirable characteristics which our tomato basic does have. Furthermore, the handling costs are cheaper for there is no need for controlled atmospheric conditions under which the handling is accomplished. All of these advantages cumulatively serve to reduce the cost and production rates of an improved end product.

It should be noted, that products which use our new tomato basic have a longer shelf life than those which utilize other tomato basic products. For example, a pizza mix which utilizes our tomato basic product has a much longer shelf life than the same product when a different tomato basic is utilized in the manufacture thereof.

From the above, it can be readily seen that we have developed a new method or process of manufacture of a tomato basic which has a number of distinct advantages. The cost of manufacture is substantially less, and the process is substantially easier to practice. The end product is much more desirable in that it is stable as to color and flavor and it is nonhygroscopic so that it does not tend to cake or become lumpy while stored on the shelf. Furthermore it does not tend to take on other flavors nor to have its own flavor changed as a result of storage.

Wherever hereinafter the term pan-drying is utilized, it is intended to include the method of drying sometimes referred to as shelf drying or any other method of drying wherein the product to be dried is laid out in a relatively thin layer and dried while in that condition. Wherever the term edible fats is used, it is intended to include such materials as shortening and other edible fats and oils. The term starch when used hereinafter is intended to include the product ordinarily known as starch as well as wheat flour, potato flour, and other materials having high starch content.

As previously stated, the end product resulting from our process, is in a non-hygroscopic, very porous, sheet form as it leaves the pan or shelf drying cabinet. In this porous, dried state the tomato solids are present in proportions of about 61% by weight, the starch is present in proportions of about 18.5% by weight, and the edible fats are present in proportions of about 10.5% by weight. The remaining 10% is moisture. It will be readily appreciated, of course, that the same proportions approximately hold true for this product in its granular state as shown in Fig. 2. It will be readily appreciated, of course, that if the product is dried so that the moisture content is below 10%, the proportions of tomato solids, starch, and fats will increase accordingly.

It will, of course, be understood that various changes may be made in the form, details, arrangements, and proportions of the various parts without departing from the scope of our invention.

What is claimed is:

1. A method of producing a tomato basic consisting in pan drying in a vacuum of about 28.5 inches of mercury an aqueous liquid mixture of tomato solids in proportions of about 26% by weight, starch in proportions of about 5% by weight, and edible fats in proportions of about 3.5% by weight, and terminating the drying of said mixture when the temperature of said mixture reaches 130° F.

2. A method of producing a tomato basic consisting in pan drying in a vacuum of approximately 28.5 inches of mercury and at a temperature of about 190° an aqueous liquid mixture of tomato solids in proportions of approximately 26% by weight, starch in proportions of approximately 5% to 7% by weight, and shortening in proportions of approximately 3% to 4% by weight, and terminating the drying of said mixture when the temperature of said mixture is between 80° F. and 160° F.

3. A method of producing a tomato basic consisting in pan drying in a vacuum of at least 27.5 inches of mercury and at a temperature no greater than about 190° F., an aqueous liquid mixture of tomato solids in proportions of approximately 26% by weight, starch in proportions of a minimum of about 1% by weight, and edible fats in proportions of less than 10% by weight, and terminating the drying of said mixture when the temperature of said mixture reaches about 130° F.

4. A method of producing a tomato basic consisting in, forming an aqueous liquid mixture of tomato solids in proportions of approximately 26% by weight, starch in proportions of a minimum of about 1% by weight, and edible fats in proportions of less than 10% by weight, and pan drying said mixture in a vacuum exceeding 26 inches of mercury until the temperature of said mixture is within the range of 80° F. and 190° F.

5. The method defined in claim 4 wherein the drying of said mixture is terminated when the temperature of said mixture reaches approximately 130° F.

6. The method defined in claim 4 wherein the proportions of edible fats contained in said mixture is between 2% and 5% by weight.

7. The method defined in claim 4 wherein the proportions of starch contained in said mixture is between 5% and 9% by weight.

8. The method defined in claim 4 wherein the proportions of starch contained in said mixture is between 5% and 7% by weight.

9. The method defined in claim 4 wherein the starch contained in said mixture is approximately 6.5% by weight.

10. The method defined in claim 4 wherein the edible fats in said mixture are in proportions of 3% to 4% by weight.

11. The method defined in claim 4 wherein the edible fats in said mixture are in proportions of 3% to 4% by weight and the starch in said mixture is in proportions of between 5% and 7% by weight.

12. The method defined in claim 4 wherein the edible fats in said mixture are in proportions of between 3% and 4% by weight and the starch in said mixture is in proportions of between 5% and 7% by weight, and the vacuum in which said pan drying takes place is approximately 28.5 inches of mercury.

13. The method defined in claim 4 wherein the vacuum in which said mixture is pan dried is above 27.5 inches of mercury.

14. The method defined in claim 4 wherein the vacuum in which said mixture is pan dried is approximately 28.5 inches of mercury.

15. A tomato basic comprising a non-hygroscopic very porous sheet of material comprised of water in proportions of about 10% by weight, tomato solids in proportions of about 61% by weight, starch in proportions of about 18.5% by weight, and edible fats in proportions of about 10.5% by weight.

16. A tomato basic comprising a non-hygroscopic granular material comprised of water in proportions of about 10% by weight, tomato solids in proportions of about 61% by weight, starch in proportions of about 18.5% by weight, and edible fats in proportions of about 10.5% by weight.

References Cited in the file of this patent

UNITED STATES PATENTS

| | | |
|---|---|---|
| 942,287 | Schroen | Dec. 7, 1909 |
| 1,236,831 | Fatica | Aug. 14, 1917 |
| 1,355,731 | Bloch | Oct. 12, 1920 |
| 1,354,563 | Jaeger | Oct. 5, 1920 |
| 2,203,643 | Musher | June 4, 1940 |

OTHER REFERENCES

Food Industries, April 1944, pp. 67–71 (vol. pp. 258–262), article entitled "1 Percent Moisture Attained by Vacuum Dehydration."